(12) United States Patent
Maroney et al.

(10) Patent No.: US 10,587,109 B1
(45) Date of Patent: Mar. 10, 2020

(54) ADAPTER SYSTEM FOR CONVERSION OF AN INSTALLED MEDIUM-VOLTAGE AIR TERMINATION TO A DEAD-FRONT SEPARABLE CONNECTOR

(71) Applicant: S&C Electric Company, Chicago, IL (US)

(72) Inventors: Michael R. Maroney, Chicago, IL (US); Phillip J. Fahey, Wilmette, IL (US); David J. Beseda, Park Ridge, IL (US)

(73) Assignee: S&C Electric Company, Chicago, IL (US)

( * ) Notice: Subject to any disclaimer, the term of this patent is extended or adjusted under 35 U.S.C. 154(b) by 0 days.

(21) Appl. No.: 16/456,059

(22) Filed: Jun. 28, 2019

Related U.S. Application Data

(60) Provisional application No. 62/725,318, filed on Aug. 31, 2018.

(51) Int. Cl.
*H02G 15/064* (2006.01)
*H01R 13/648* (2006.01)

(52) U.S. Cl.
CPC ......... *H02G 15/064* (2013.01); *H01R 13/648* (2013.01)

(58) Field of Classification Search
CPC .................................................. H02G 15/064
USPC ........................................................ 174/73.1
See application file for complete search history.

(56) References Cited

U.S. PATENT DOCUMENTS 3,813,639 A * 5/1974 Schurter ................ H01R 13/53
439/184

* cited by examiner

*Primary Examiner* — Stanley Tso

(57) ABSTRACT

An air-termination adapter that encloses an air-termination connection assembly to electrically isolate components that are at hazardous voltages and allow the air-termination connection assembly to be coupled to a dead-front termination for electrical equipment. In one embodiment, the adapter includes an outer body having a lower conical section, a middle cylindrical section and an upper cylindrical connection section all defining an internal chamber. The air-termination connection assembly extends into the chamber from the bottom of the lower section and is coupled to a connector rod at one end. The connector rod is coupled to a connector associated with a conical interface in the connection section to provide the dead-front termination to the electrical equipment.

10 Claims, 5 Drawing Sheets

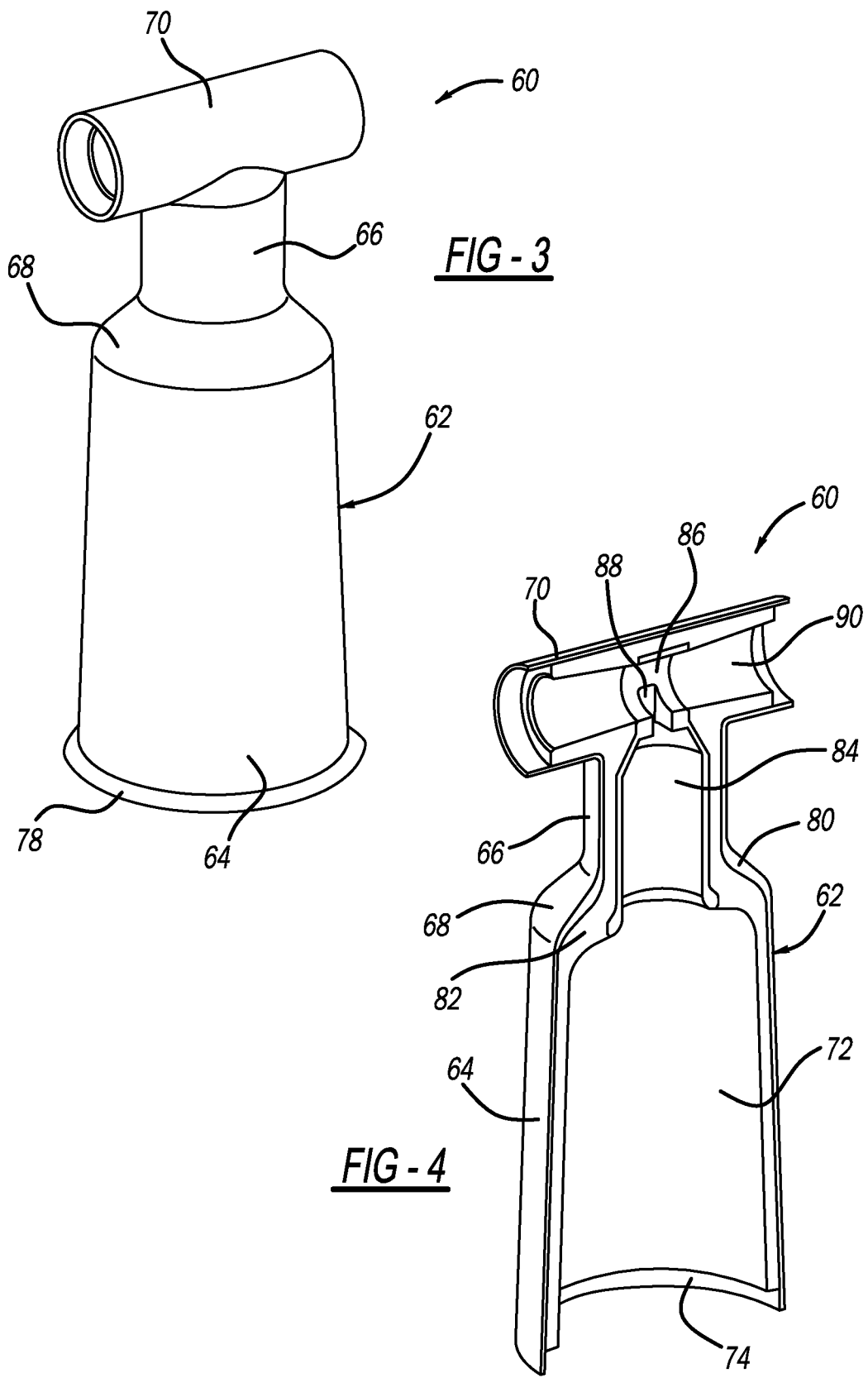

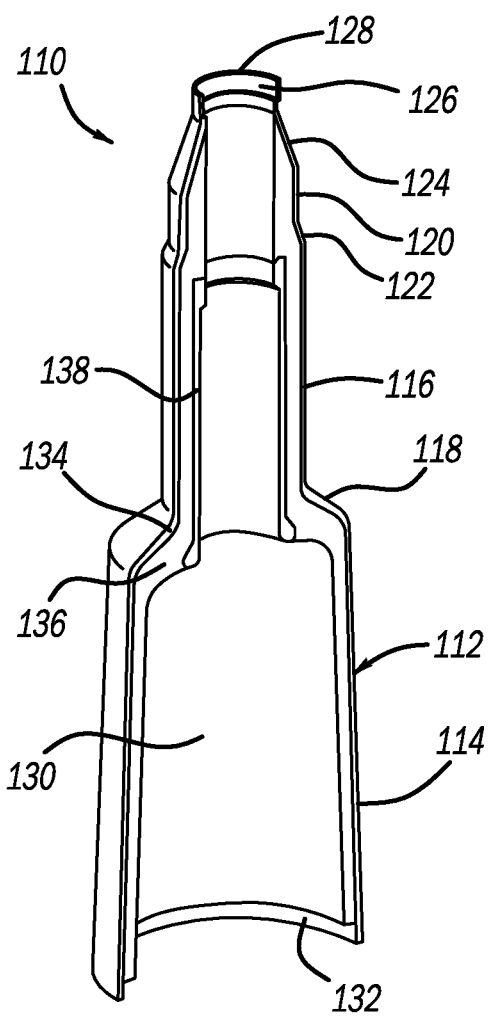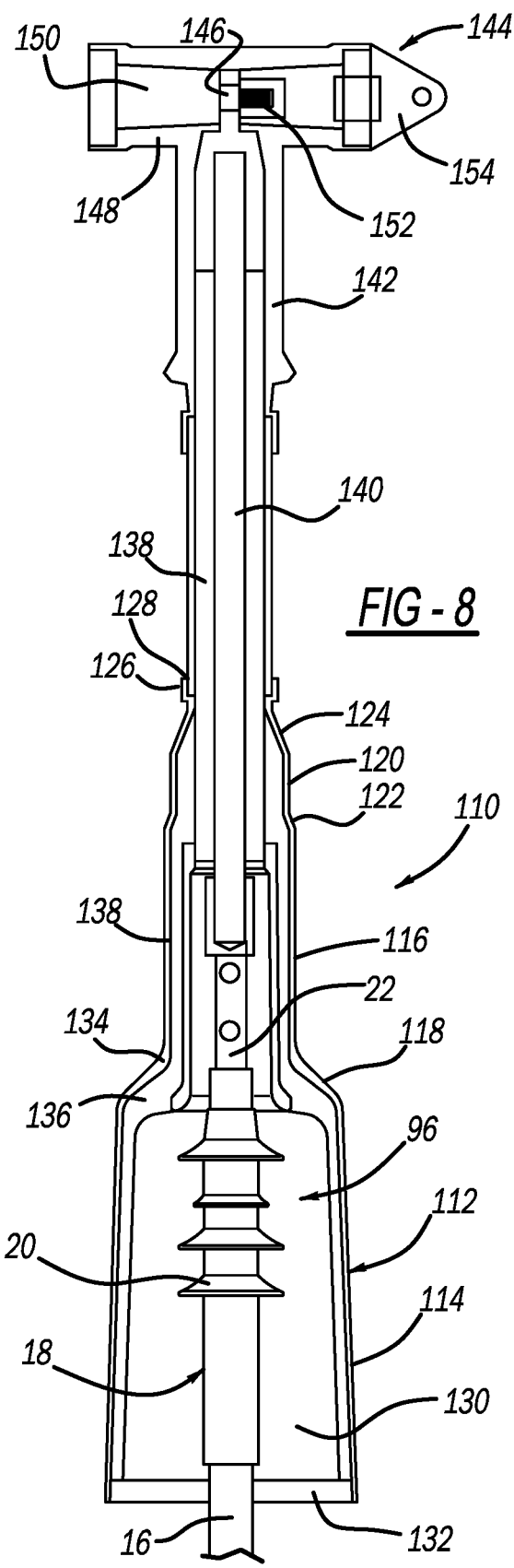

ADAPTER SYSTEM FOR CONVERSION OF AN INSTALLED MEDIUM-VOLTAGE AIR TERMINATION TO A DEAD-FRONT SEPARABLE CONNECTOR

CROSS-REFERENCE TO RELATED APPLICATION

This application claims the benefit of priority from the U.S. Provisional Application No. 62/725,318, filed on Aug. 31, 2018, the disclosure of which is hereby expressly incorporated herein by reference for all purposes.

BACKGROUND

Field

This disclosure relates generally to an air-termination adapter for enclosing and electrically isolating an air-termination connection assembly and, more particularly, to an air-termination adapter for enclosing and electrically isolating an air-termination connection assembly, where the adapter operates in combination with a connection rod for coupling the connection assembly to a dead-front termination in a switchgear.

Discussion of the Related Art

An electrical power distribution network, often referred to as an electrical grid, typically includes a number of power generation plants each having a number of power generators, such as gas turbine engines, nuclear reactors, coal-fired generators, hydro-electric dams, etc. The power plants provide a high voltage AC signal on high voltage transmission lines that deliver electrical power to a number of substations typically located within a community, where the voltage is stepped down to a medium voltage. The substations provide the medium voltage power to a number of three-phase feeder lines. The feeder lines are coupled to a number of lateral lines that provide the medium voltage to various transformers, where the voltage is stepped down to a low voltage and is provided to a number of loads, such as homes, businesses, etc.

Power distribution networks of the type referred to above include a number of switching devices, breakers, reclosers, interrupters, etc. that control the flow of power throughout the network. Some of these components are enclosed in a number of external housings that are mounted on, for example, a concrete pad, or mounted underground, and are generally referred to herein as switchgear. The number and type of switchgear are application specific to the particular power network.

Electrical cables going into and out of the switchgear are terminated or connected to certain electrical devices or equipment, such as switches, within the switchgear. For many of these applications, an air-termination is employed to connect the cable to a connection point, where the air-termination is configured to grade the electrical stress from the ground shield on the cable, and where the air-termination includes sheds that increase the surface distance from the high voltage connection to ground. However, this type of known air-termination and connection assembly in the switchgear provides a number of exposed conductors that create exposure to hazardous voltages to personnel that operate or service the equipment.

SUMMARY

The following discussion discloses and describes an air-termination adapter that encloses an air-termination connection assembly to electrically isolate components that are at hazardous voltages and allow the air-termination connection assembly to be coupled to a dead-front termination for electrical equipment. In one embodiment, the adapter includes an outer body having a lower conical section, a middle cylindrical section and an upper cylindrical connection section all defining an internal chamber. The air-termination connection assembly extends into the chamber from the bottom of the lower section and is coupled to a connector rod at one end. The connector rod is coupled to a connector associated with a conical interface in the connection section to provide the dead-front termination to the electrical equipment.

Additional features of the disclosure will become apparent from the following description and appended claims, taken in conjunction with the accompanying drawings.

BRIEF DESCRIPTION OF THE DRAWINGS

FIG. 3 is an isometric view of an air-termination adapter for enclosing an air-termination connection assembly and providing an integral dead-front termination;

FIG. 4 is a broken-away isometric view of the adapter shown in FIG. 3;

FIG. 7 is a broken-away isometric view of the adapter shown in FIG. 6;

FIG. 8 is a cross-sectional view of the adapter shown in FIG. 6 and showing the air-termination connection assembly and the T-body connector.

DETAILED DESCRIPTION OF THE EMBODIMENTS

The following discussion of the embodiments of the disclosure directed to an air-termination adapter configured to enclose an air-termination and provide a dead-front termination to electrical equipment is merely exemplary in nature, and is in no way intended to limit the invention or its applications or uses. For example, in the discussion herein the adapter is employed in connection with equipment in switchgear. However, the air-termination adapter may have other applications.

Figure 1:
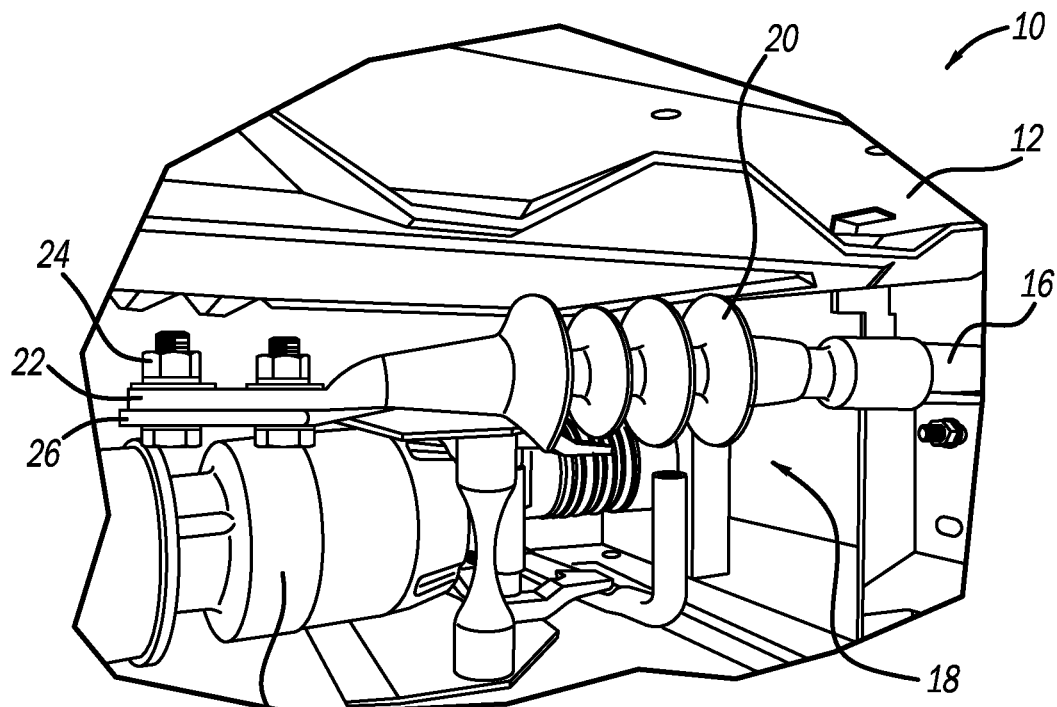
FIG. 1 is a broken-away isometric view of a known switchgear including an air-termination.

FIG. 1 is a broken-away isometric view of a known switchgear 10 having an outer housing 12 in which is mounted electrical equipment 14, such as switching devices. For purposes of the discussion herein, the switchgear 10 is intended to represent any switchgear, pad mounted or otherwise, that includes any suitable configuration of components, devices and equipment configured in the housing 12 that provide switching and disconnecting of and between electrical cables 16 coupled thereto that are part of an electrical distribution network, such as a medium voltage network, where only one of the cables 16 is shown. The cable 16 extends through an air-termination 18 having sheds 20, and is electrically coupled to a plate 22 that is bolted by bolts 24 to a connector 26 for the equipment 14. In this design, the plate 22 and the connector 26 are at a hazardous voltage potential and are exposed to the environment creating a potentially hazardous situation for personnel that operate or service the switchgear 10 and the equipment 14.

Figure 2:
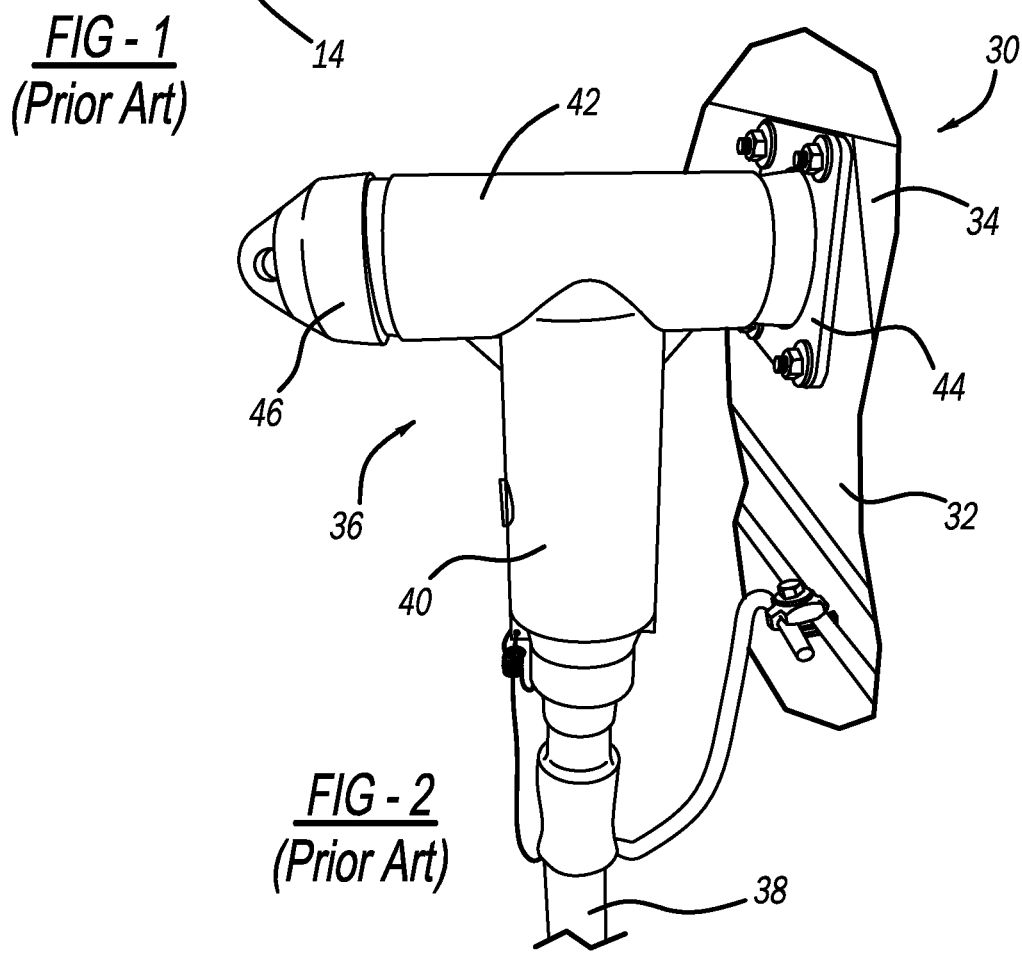
FIG. 2 is a broken-away isometric view of a known switchgear including a series of T-body connectors.

In order to help reduce the risk of exposure to hazardous voltage potentials, more modern switchgear designs employ different types of connectors. FIG. 2 is a broken-away isometric view of a known switchgear 30 having an outer housing 32 in which is mounted electrical equipment 34, such as switching devices. A T-body connector 36 connects a cable 38 to the equipment 34, where the T-body connector 36 includes an extension portion 40 that is electrically coupled to the cable 38 and a connection portion 42 that is both mechanically and electrically attached to a cable attachment plate 44 through a connection referred to in the industry as a dead-front termination well understood by those skilled in the art. The connection portion 42 includes a cap 46 opposite to the plate 44 that allows a worker to gain access to a mounting stud (not shown) that both provides mechanical support and electrical continuity. The T-body connector 36 may include an inner conductor (not shown), an insulation layer (not shown), such as a dielectric rubber layer, covering the conductor, and a grounded semi-conductive outer layer 46, such as a semi-conductive rubber layer, covering the dielectric layer, which ensures that there is no exposure to energized conductors.

This disclosure discusses and describes an air-termination adapter that encloses the air-termination 18 and other electrical components so as to eliminate any potentially exposed hazardous voltages and also allow the air-termination 18 to be electrically coupled to a T-body connector for connection to a dead-front termination. The adapter has particular application for use with older switchgear employing air-termination connections that have been upgraded to include dead-front terminations. The adapter simplifies the installation and connection of new dead-front connection equipment that replaces air-terminated equipment by converting the air-termination cable so that it can be connected to the new dead-front equipment.

FIG. 3 is an isometric view and FIG. 4 is a broken-away isometric view of an air-termination adapter 60 showing one embodiment of the type of adapter referred to above. The adapter 60 includes a single piece molded body 62 having a lower conical portion 64, a middle cylindrical portion 66, a tapered portion 68 between the lower portion 64 and the middle portion 66, and an upper cylindrical connector portion 70, where the connector portion 70 gives the adapter 60 a general T-shape. The body 62 defines an internal chamber 72 that is open at a bottom end 74 of the lower portion 64, where an optional cover 78 (only shown in FIG. 3) can be "snapped on" or secured to the bottom end 74 to cover the opening and prevent animals from entering the chamber 72. The body 62 includes a semi-conductive outer shielding layer 80, such as a semi-conductive rubber layer, that covers a dielectric insulating layer 82, where the insulating layer 82 is formed as a conical interface 90 within the connector portion 70. An inner semi-conductive layer 84, which may be the same material as the shielding layer 80, is provided within the middle portion 66 and is operable to provide electrical grading. The layer 84 includes a collar portion 86 positioned in the connector portion 70 and having a slot 88.

Figure 5:
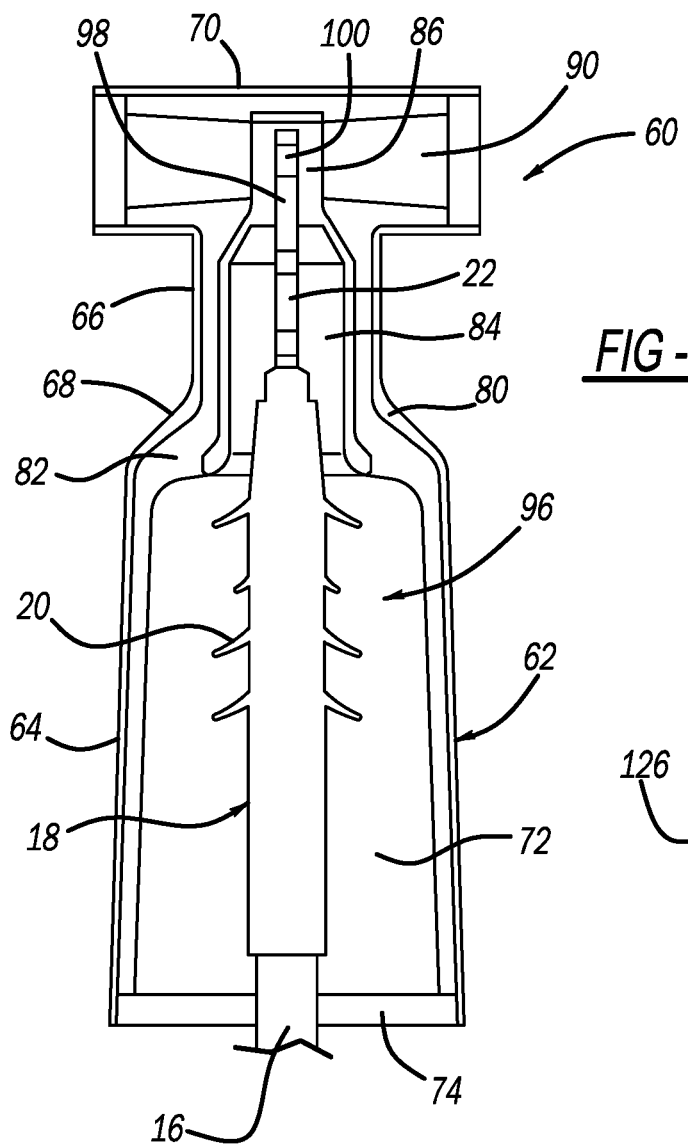
FIG. 5 is a cross-sectional view of the adapter shown in FIG. 3 and showing the air-termination connection assembly.

FIG. 5 is a cross-sectional view of the adapter 60 showing an air-termination connection assembly 96 extending into the chamber 72, where the connection assembly 96 includes the cable 16, the air-termination 18 and the plate 22. The plate 22 is positioned within the chamber 72 in the middle portion 66 and is coupled to one end of a connector rod 98. An opposite end of the rod 82 having an annular terminal 100 extends through the slot 88 and is positioned within the interface 90.

The adapter 60 is installed on the connection assembly 96 by first disconnecting the plate 22 from, for example, the connector 26, securing the rod 98 to the plate 22 using, for example, the bolts 24, inserting the rod 98 and the connection assembly 96 through the opening at the bottom end 74 of the lower portion 64, and extending the rod 98 through the slot 88 so that the terminal 100 is positioned within the interface 90. The cover 78 is removed and attached to the bottom portion 64 as necessary. To connect the adapter 60 to the equipment, a stud (not shown) is threaded into a bushing interface (not shown) on the equipment, one end of the interface 90 is positioned over the bushing so that the stud extends into the interface 90 and through the terminal 100, and a plug (not shown) is inserted into an opposite end of the interface 90 and threaded onto the stud so that the rod 98 makes an electrical connection with the bushing. In this manner, the cable 16 is coupled to the equipment in the switchgear through a dead-front termination, and all of the components that may be at a hazardous voltage are enclosed within the adapter 60.

Figure 6:
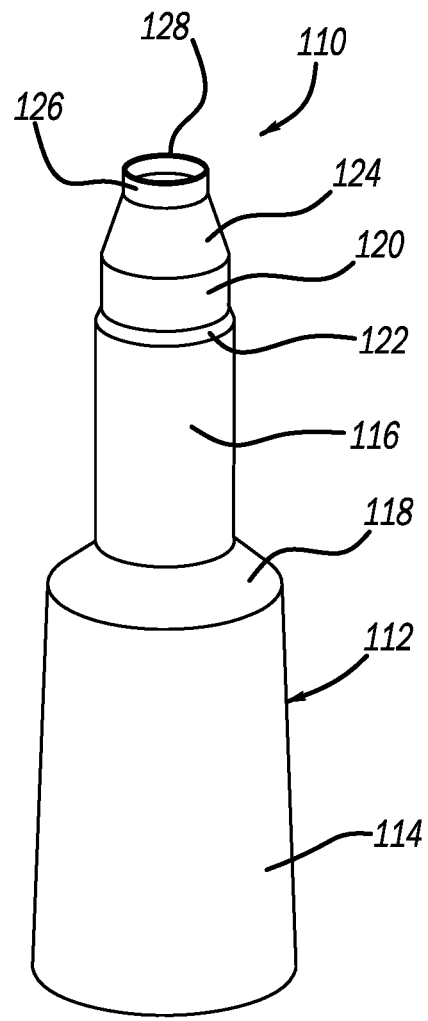
FIG. 6 is an isometric view of an air-termination adapter for enclosing an air-termination connection assembly and providing a connection to a T-body connector.

In an alternate embodiment, T-body connectors may already be employed in the switchgear to provide the dead-front terminations, and the older air-terminations may be connected to the T-body connectors. FIG. 6 is an isometric view and FIG. 7 is a broken-away isometric view of an air-termination adapter 110 showing one embodiment of an adapter of the type referred to above that can be employed in this situation. The adapter 110 includes a single piece molded body 112 having a lower conical portion 114, a lower middle cylindrical portion 116, a tapered portion 118 between the lower portion 114 and the middle portion 116, an upper middle cylindrical portion 120, a tapered portion 122 between the cylindrical portions 116 and 120, an upper conical portion 124 and an annular portion 126. The body 112 defines an internal chamber 130 that is open at a bottom end 132 of the lower portion 114 and a top end 128 of the annular portion 126. The body 112 includes a semi-conductive outer shielding layer 134 that covers a dielectric insulating layer 136 and an inner semi-conductive layer 138, which may be the same material as the shielding layer 134, is provided within the middle portion 116 that provides electrical grading.

FIG. 8 is a cross-sectional view of the adapter 110 showing the air-termination connection assembly 96 extending into the chamber 130. The plate 22 is positioned within the chamber 130 at the middle portion 116 and is coupled to one end of a connector rod 140, where the rod 140 is positioned within an insulating sleeve 142. The rod 140 extends out of the opening at the top end 128 of the adapter 110 and an opposite end of the rod 140 is inserted into an extension portion 142 of a T-body connector 144 and is electrically coupled to an annular terminal 146 in a connection portion 148 of the connector 144. The connection portion 148 includes an interface connector 150, a stud 152 and a plug 154 that allow the T-body connector 142 to be coupled to the equipment bushing interface in the same manner described above. The adapter 110 is installed on the connection assembly 96 by first connecting the rod 140 to the T-body connector 144, sliding the connection assembly 96 through the opening at the bottom end 132 of the lower portion 114 so that the plate 22 sticks out of the opening at the top end 128 of the annular portion 126, and securing the rod 140 to the plate 22.

Figure 9:
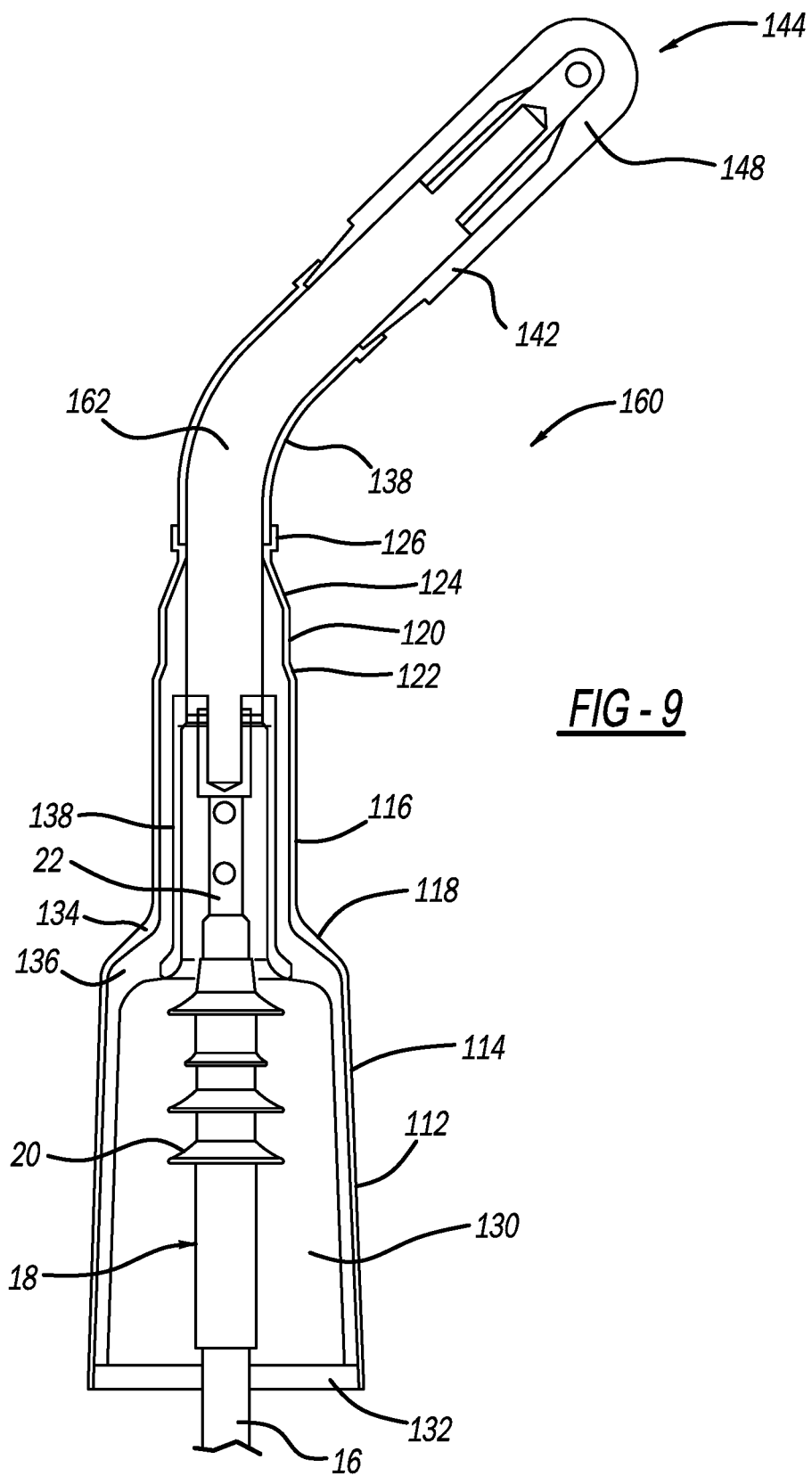
FIG. 9 is a cross-sectional view of the adapter shown in FIG. 6 and showing the air-termination connection assembly and the T-body connector, where a connector rod coupled to the T-body connector is curved.

The rod 140 is straight, and depending on the particular switchgear may not allow the connection assembly 96 to be properly connected to the T-body connector 144 because of the location of the equipment bushing interface. However, by bending the rod 140 a proper connection can likely be made. This embodiment is illustrated in FIG. 9 by air-termination adapter 160, where like elements to the adapter 110 are identified by the same reference number. In the adapter 160, the rod 140 has been replaced with a curved connector rod 162 so as to better allow the connection assembly 96 to be connected to the bushing interface.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. An air-termination adapter for enclosing an air-termination,
said adapter comprising a body including a plurality of body sections defining a chamber and giving the body a general conical shape and a connection portion including an interface having an opening at each end of the connection portion and being in communication with the chamber,
wherein the plurality of body sections include a lower conical portion,
a lower middle cylindrical portion,
a tapered portion between the lower conical portion and the middle cylindrical portion,
an upper middle cylindrical portion,
a tapered portion between the cylindrical portions,
an upper conical portion and an annular portion,
the body being a single piece molded body including an outer semi-conductive layer formed over a dielectric layer
and the outer semi-conductive layer is a rubber layer
and an inner semi-conductive layer on an opposite side of the dielectric layer from the outer semi-conductive layer,
and wherein further the lower body portion and the connection portion define a general T-shape,
said lower body portion including an opening opposite to the connection portion for accepting the air-termination.

2. The adapter according to claim 1 wherein the connection portion is cylindrical.

3. The adapter according to claim 2 wherein the interface is a conical interface that provides a dead-front termination.

4. The adapter according to claim 1 wherein the body further includes an inner semi-conductive layer on an opposite side of the dielectric layer from the outer semi-conductive layer.

5. The adapter according to claim 4 wherein the inner semi-conductive layer extends into the connection portion.

6. The adapter according to claim 1 wherein the air-termination provides an electrical connection between a cable and equipment in switchgear.

7. The adapter according to claim 1 further comprising a cap that covers the opening.

8. An air-termination adapter being configured for enclosing an air-termination,
said adapter comprising a body including a plurality of body sections that define a chamber and give the body a general conical shape,
wherein the plurality of body sections include a lower conical portion,
a lower middle cylindrical portion,
a tapered portion between the lower conical portion and the middle cylindrical portion,
an upper middle cylindrical portion, a tapered portion between the cylindrical portions,
an upper conical portion and an annular portion,
the body being a single piece molded body including an outer semi-conductive layer formed over a dielectric layer
and the outer semi-conductive layer is a rubber layer
and an inner semi-conductive layer on an opposite side of the dielectric layer from the outer semi-conductive layer,
and wherein further said chamber being in communication with a lower opening in the body and an upper opening in the body.

9. The adapter according to claim 8 wherein the air-termination provides an electrical connection between a cable and equipment in switchgear.

10. An air-termination adapter being configured to enclose an air-termination,
said adapter comprising a body including a plurality of body sections that define a chamber and give the body a general conical shape,
said chamber being in communication with a lower opening in the body,
wherein the body is a single piece molded body including an outer semi-conductive layer formed over a dielectric layer and an inner semi-conductive layer on an opposite side of the dielectric layer from the outer semi-conductive layer,
and wherein the plurality of body sections include a lower conical portion,
a lower middle cylindrical portion,
a tapered portion between the lower conical portion and the middle cylindrical portion,
an upper middle cylindrical portion,
a tapered portion between the cylindrical portions,
an upper conical portion and an annular portion and the outer semi-conductive layer is a rubber layer,
and wherein further the air-termination provides an electrical connection between a cable and equipment in switchgear.

* * * * *